United States Patent
Manganiello et al.

(10) Patent No.: US 10,827,423 B1
(45) Date of Patent: Nov. 3, 2020

(54) COMMUNICATING VIA AT LEAST TWO DIFFERENT RADIO ACCESS TECHNOLOGIES

(71) Applicant: Sprint Spectrum LLP, Overland Park, KS (US)

(72) Inventors: Charles Manganiello, Paola, KS (US); Amrit Kumar Chandra, Ashburn, VA (US); Jay R. Chernoff, Pawleys Island, SC (US); Kristian Kai Johns, Ashburn, VA (US); David Zhijun Sun, Broadlands, VA (US); Neehar Kulkarni, Herndon, VA (US); Mayur Shirwadkar, Arlington, VA (US); Liang Li, Darnestown, MD (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/405,210

(22) Filed: May 7, 2019

(51) Int. Cl.
| | |
|---|---|
| *H04W 48/10* | (2009.01) |
| *H04W 48/20* | (2009.01) |
| *H04W 88/04* | (2009.01) |
| *H04W 88/06* | (2009.01) |
| *H04W 88/10* | (2009.01) |

(52) U.S. Cl.
CPC .......... *H04W 48/20* (2013.01); *H04W 48/10* (2013.01); *H04W 88/04* (2013.01); *H04W 88/06* (2013.01); *H04W 88/10* (2013.01)

(58) Field of Classification Search
CPC ..... H04W 48/20; H04W 48/10; H04W 88/06; H04W 88/10; H04W 88/04
See application file for complete search history.

(56) References Cited

U.S. PATENT DOCUMENTS

| | | | |
|---|---|---|---|
| 10,244,422 B2 | 3/2019 | Parulkar | |
| 2013/0021962 A1 | 1/2013 | Hu et al. | |
| 2013/0172000 A1 | 7/2013 | Van Phan et al. | |
| 2015/0092709 A1* | 4/2015 | Su ........................ | H04W 48/16 370/329 |
| 2019/0274121 A1* | 9/2019 | Wu ...................... | H04L 5/0053 |

* cited by examiner

*Primary Examiner* — Chuong A Ngo

(57) ABSTRACT

Systems, methods, and processing nodes for communicating using at least two different radio access technologies (RATs) include determining whether or not an access node is capable of communicating using the at least two RATs (e.g. using 4G LTE and 5G NR, also known as 5G EN-DC), and instructing the access node to broadcast an indicator, wherein receiving the indicator, a wireless device can attach to both first and second RATs. The wireless device is further instructed to prioritize which combination of RATs to attach to based on a signal level transmitting using each RAT.

19 Claims, 9 Drawing Sheets

COMMUNICATING VIA AT LEAST TWO DIFFERENT RADIO ACCESS TECHNOLOGIES

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Combinations of wireless devices designated as relays (henceforth, "relay wireless devices") that are co-located with relay access points may be used at the edge of a coverage area of a donor access node to improve coverage and/or service, as well as in crowded areas having a high number of other wireless devices to increase the available throughput to the end-user wireless devices being relayed. Further, "Dual Connectivity" refers to the ability for wireless devices to attach to two or more access nodes and transmit/receive information via two wireless connections simultaneously.

However, with the increasing implementation of radio access technologies (RATs) such as 5G New Radio (NR) over existing RATs such as 3G and 4G Long Term Evolution (LTE), there are additional considerations regarding how relay nodes can effectively service wireless devices that are attached to it, and how donor access nodes are increasingly capable of both 4G LTE and 5G NR RATs, particularly if there are multiple available donor access nodes with different capabilities. Further, communicating using both 4G and 5G RATs, or any combination or RATs, is not fully clarified in the 3GPP technical specifications, nor are there any viable solutions in the current state of the art that attempt to seamlessly allow 4G and 5G capable wireless devices and relay nodes to connect to various access nodes using at least two different RATs.

Overview

Exemplary embodiments described herein include systems, methods, and processing nodes for communication via different radio access technologies (RATs). An exemplary method for communicating via at least two different RATs includes determining when a first access node is capable of communicating via a first RAT and a second RAT and, upon determining when the first access node is capable of communicating via the first RAT and the second RAT, instructing the first access node to broadcast a first indicator, the first indicator indicating that the first access node is capable of communicating via at least two RATs. Upon receiving the first indicator, a wireless device attaches to the first RAT and the second RAT.

An exemplary system for communicating via at least two different RATs includes a processing node, and a processor coupled to the processing node. The processor can be configured to perform operations including determining that a wireless device is within range of a first access node capable of communication using a first RAT and a second RAT, and a second access node capable of communication using the first RAT and not the second RAT, determining that the wireless device is capable of communication using the first RAT and the second RAT, and instructing the wireless device to prioritize attaching to the first access node versus the second access node.

An exemplary processing node for communicating via at least two different RATs is configured to perform operations including determining that a first access node from among a plurality of access nodes is capable of communication using at least two different RATs, determining that a second access node from among the plurality of access nodes is not capable of communication using the at least two different RATs, and instructing a wireless device to prioritize which of the first or second access nodes to attach to based on a signal level of each access node.

DETAILED DESCRIPTION

Figure 1:
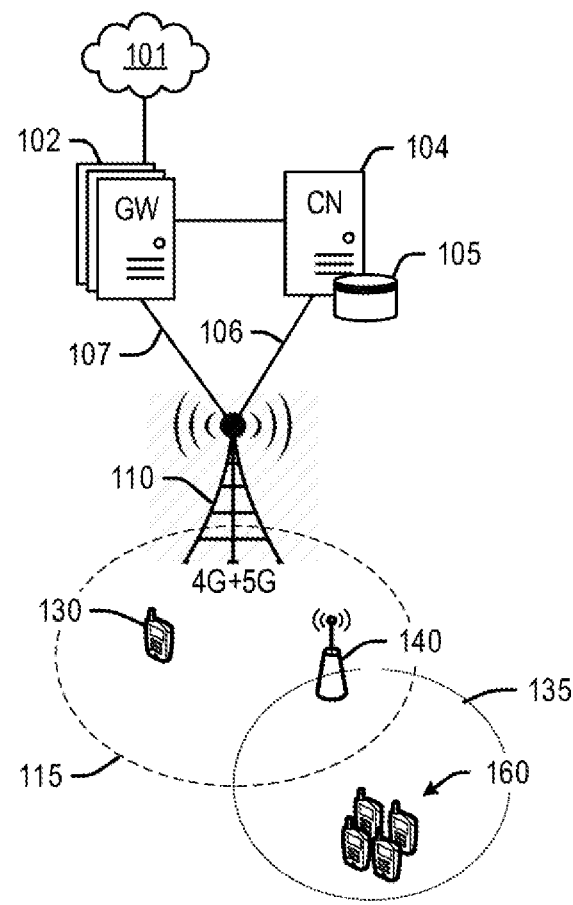
FIG. 1 depicts an exemplary system for communicating via at least two different RATs.

Communicating via at least two different RATs can be enabled by determining when a first access node is capable of communicating via a first RAT and a second RAT and, upon determining when the first access node is capable of communicating via the first RAT and the second RAT, instructing the first access node to broadcast a first indicator, the first indicator indicating that the first access node is capable of communicating via at least two RATs. Upon receiving the first indicator, a wireless device attaches to the first RAT and the second RAT. The first access node may among a plurality of access nodes of any type, including macrocell access nodes such as Long-Term-Evolution (LTE) eNodeBs or 5G New Radio (NR) gNodeBs, mini access nodes, home eNodeBs or gNodeBs, etc. In an exemplary embodiment, determining when the first access node is capable of communicating via both first and second RATs comprises determining that the first access node is combination of an eNodeB and a gNodeB. In other words, the first access node can comprise antennae that are configured to communicate using 4G LTE (i.e. the first RAT) as well as antennae that are configured to communicate using 5G NR (the second RAT). In another exemplary embodiment, determining when the first access node is capable of communicating via both first and second RATs comprises determining that the first access node comprises an eNodeB that is communicatively coupled to a gNodeB. For example, an eNodeB can be coupled with a gNodeB via an X2 connection. Whereas, when it is determined that the first access node comprises transceivers capable of both eNodeB and a gNodeB, the respective transceivers (and associated processing nodes) may be virtually coupled with a logical X2 connection, or similar, such that a single access node is capable of the above functions. Further, in an exemplary embodiment, control information can be transmitted via the first RAT, while data information (i.e. payloads, etc.) can be transmitted via the second RAT. For example, the second RAT is any RAT that utilizes a higher frequency and/or a higher channel bandwidth than the first RAT. Generally, 5G NR utilizes larger channel bandwidths and frequencies than 4G LTE. Thus, transmitting data information using the second RAT (e.g. 5G) can be beneficial to network operation by, for instance, improving throughput, while transmitting signaling information using the first RAT (e.g. 4G) can be beneficial by, for instance, utilizing ubiquitous existing infrastructure for performing signaling operations. In an alternate embodiment, while control information is transmitted using the first RAT, data information can be transmitted using any combination of RATs.

Further, the wireless device may comprise any wireless device that is capable of dual connectivity with both first and second RATs. Thus, wireless devices capable of attaching to both 4G LTE and 5G NR may include any wireless device with transceivers capable of such communication, such as a gigabit-class LTE modem and a gigabit-class 5G modem. Such a wireless device can support high frequency, short wave length radio communication associated with 5G NR, and can be capable of adaptive beam-forming and beam tracking, 8X carrier aggregation (CA), combining different 100 MHz blocks of millimeter wave spectrum, etc. are encouraged to do so. Thus, in an exemplary embodiment, operations include determining whether or not the wireless device is capable communicating using both RATs, responsive to which the wireless device can be instructed to attach to both RATs. Further, the wireless device can comprise a relay node that is configured to relay data between an access node and one or more end-user wireless devices attached to the relay node. The relay node may be a small cell access node, a home eNodeB, etc. For example, the relay node can be configured to attach to the first access node using both RATs. In an exemplary embodiment, the relay node includes a relay wireless device coupled to a relay access point, and is configured to relay data packets between an access node and an end-user wireless device attached to the relay access point. For example, the relay wireless device can be capable of communicating with the first access node using both RATs. In embodiments where the wireless device comprises a relay node (or a relay wireless device coupled to a relay access point), the serving access node(s) may be referred to as donor access node(s), and any wireless connection between the donor access node(s) and the wireless device may be referred to as a backhaul connection. In an exemplary embodiment, responsive to determining that the wireless device comprises a relay node, the wireless device is instructed to prioritize attaching to the first access node using both RATs over any other access node using a single RAT, even when a signal measurement of the first access node is lower than a signal measurement of the other access nodes.

Further, instructing the first access node to broadcast the indicator can include instructing the first access node to broadcast the indicator in a system information message. As described above, the first RAT may be used to control and set up the wireless device, and the second RAT (or any combination of the first and second RATs) may be used to transmit user data. In other words, control information (including system information message broadcasts) is transmitted from using the first RAT. Thus, in an exemplary embodiment, the first access node is instructed to transmit the indicator, which can be received by a wireless device within a coverage area of the first access node. For example, a upperlayerindication-r15 value within a system information broadcast message (e.g. a SIB3 message) can be set to a TRUE value or a FALSE value, wherein a TRUE value indicates that the first access node is capable of communicating via both RATs, and a FALSE indication (or no indication) can be indicative that the first access node is not capable of communicating via both RATs. Thus, when a wireless device capable of communicating via both RATs (for example, a wireless device or relay node with both 4G LTE and 5G NR transceivers as described above) is within range of the first access node and receives a TRUE indicator via a system information broadcast, the wireless device can attach to the access node using both first and second RATs. Further, as described above, the capability of the wireless device to utilize both RATs may be obtained prior to performing these operations. For example, the first access node can be configured to receive a capability of the wireless device via, for example, a radio resource control (RRC) message transmitted from the wireless device.

In exemplary embodiments described herein, the wireless device is instructed to prioritize between attaching to the first access node (that is capable of communicating using both RATs) versus attaching to any other access nodes that are not capable of communicating using both RATs. For example, the first access node may be among a plurality of access nodes, along with a second access node that may not be capable of communicating using both RATs (either because it does not contain the appropriate transceivers, or because it is not in direct communication with another access node utilizing the $2^{nd}$ RAT). Other combinations of access nodes, whether directly connected or not, and whether capable of different RATs or not, may be envisioned. Further, in an exemplary embodiment, the wireless device can be instructed to prioritize attaching to a first access node that is capable of using both RATs versus a second access node that is incapable of using both RATs, despite a signal level of the first access node being lower than a signal level of the second access node. In other words, unlike standard operation where the wireless device determines to attach to a specific access node that has a higher reference signal level than other access nodes, in this embodiment, the wireless device may be instructed to override a signal measurement and attach to the access node capable of communicating using both RATs. In a related embodiment, a threshold may be defined for the signal level being lower. For example, a signal level of the access nodes that are capable of communicating using both RATs is required to be within a threshold amount lower than a signal level of the access nodes that are not capable of communicating using both RATs.

In an exemplary embodiment, the instruction to override signal measurements or to utilize the threshold amount is performed responsive to identifying the wireless device as a relay node. This is because relay nodes can benefit from the higher frequencies and channel sizes of 5G donor access nodes, so it is preferred to select a donor access node capable of utilizing both 4G and 5G, even if a signal level is lower, versus a donor access node that is only capable of using 4G, or incapable of both 4G and 5G for any reason. In related embodiments, the relay node is instructed to select any 5G-capable access node or combination of access nodes as donors versus any combination of access nodes that is incapable of 5G. Conversely, when the wireless device is not identified as a relay node, but is still identified as being capable of dual connectivity using both RATs, the wireless device may be instructed to prioritize attaching to access nodes with the higher signal level, whether or not they are capable of 5G. For example, a wireless device can be instructed to prioritize attaching to access nodes that are capable of utilizing both RATs unless a signal level of said access nodes is lower than a signal level of any other access nodes that are configured to utilize only one RAT. For example, if these wireless devices are end-user wireless devices, then a higher signal level may be more important to provide QoS and a positive user experience than a channel bandwidth or frequency.

Similar operations may be performed by an exemplary system described herein and comprising at least a processing node and a processor coupled to the processing node. An exemplary processing node may be configured to perform operations including determining that a wireless device is within range of a first access node capable of communication using a first RAT and a second RAT, and a second access node capable of communication using the first RAT and not the second RAT, determining that the wireless device is capable of communication using the first RAT and the second RAT, and instructing the wireless device to prioritize attaching to the first access node versus the second access node. The wireless device can be instructed to prioritize attaching to the first access node versus the second access node based in part on a signal level received from each access node. For example, if it is determined that the wireless device is a relay node, the wireless device can be instructed to prioritize attaching to the first access node even when the signal level of the first access node is lower than a signal level of the second access node. In an exemplary embodiment, the wireless device is instructed to prioritize attaching to the first access node when the signal level of the first access node is lower than a signal level of the second access node by no more than a threshold amount. Conversely, it if is determined that the wireless device is an end-user wireless device (and not a relay node), the wireless device can be instructed to prioritize attaching to the first access node unless the signal level of the first access node is lower than a signal level of the second access node.

Similar operations may be performed by a processing node communicatively coupled to any other network node within the wireless network. An exemplary processing node can be configured to perform operations including determining that a first access node from among a plurality of access nodes is capable of communication using at least two different RATs, determining that a second access node from among the plurality of access nodes is not capable of communication using the at least two different RATs, and instructing a wireless device to prioritize which of the first or second access nodes to attach to based on a signal level of each access node. Determining that the first access node is capable of communication using the at least two different RATs comprises one or both of determining that the first access node comprises transceivers capable of communicating using the at least two different RATs, or determining that the first access node is communicatively coupled via a direct connection to a third access node from among the plurality of access nodes, the first and third access nodes being configured to utilize each of the at least two different RATs. Instructing the wireless device to prioritize which of the first or second access nodes to attach to based on the signal level comprises instructing the wireless device to attach to the first access node when the signal level of the first access node is lower than the signal level of the second access node by no more than a threshold amount. In an exemplary embodiment, instructing the wireless device to attach to the first access node when the signal level of the first access node is lower than the signal level of the second access node by no more than a threshold amount is performed responsive to determining that the wireless device comprises a relay node.

These and other embodiments are further described herein and with reference to FIGS. 1-10.

FIG. 1 depicts an exemplary system 100 comprising a communication network 101, gateway 102, controller node 104, access node 110, wireless device 130, relay node 140, and end-user wireless devices 150. In this exemplary embodiment, access node 110 may be configured to deploy carriers using at least two RATs, e.g. 4G LTE and 5G NR, over a coverage area 115. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. Further, access node 110 can be configured to communicate using both RATs at the same time. For example, access node 110 can comprise antennae that are configured to communicate using 4G LTE (i.e. the first RAT) as well as antennae that are configured to communicate using 5G NR (the second RAT). In an exemplary embodiment, such communication may be referred to as 5G EN-DC, wherein the access node 110 is configured to initiate dual connections with a wireless device using both 4G and 5G carriers, the 4G carrier being used to transmit control information, and the 5G carrier being used to transmit data information. In other embodiments, access node 110 may comprise an eNodeB that is coupled to another access node comprising a gNodeB (not shown), such that the dual connectivity utilizes both access nodes. Further, in other embodiments, access node 110 can be among a plurality of access nodes, with various carriers deployed therefrom, as may be evident to those having ordinary skill in the art in light of this disclosure.

By virtue of being within coverage area 115, both wireless device 130 and relay node 140 can be in direct communication with access node 110. Further, relay node 140 may be configured to deploy another carrier over a coverage area 135 (that may utilize the same or different frequency, operating mode, or channel bandwidth as the 4G LTE or 5G NR carriers), to which end-user wireless devices 160 can attach. Relay node 140 can be configured to relay data packets between end-user wireless devices 160 and access node 110, which may be referred to as a "donor" access node when communicating via relay node 140. Thus, wireless devices 160 that are outside a coverage area of donor access node 110 may access network services from donor access node 110 by virtue of being connected to relay node 140. Further, wireless device 130 and relay node 140 may be capable of communicating with access node 110 using both first and second RATs. For example, both wireless device 130 and relay node 140 can include 4G LTE and 5G NR transceivers. Moreover, a processing node within system 100 (for example, communicatively coupled to access node 110, controller node 104, or any other network node) can be configured to determine whether or not wireless device 130 or relay node 140 are capable of communicating using both RATs, and instruct the access node 110 to broadcast an indicator in, for example, a system information message. For example, access node 110 may use the 4G carrier to control and set up a dual connectivity session with one or both of wireless device 130 and relay node 140. In other words, control information (including SIB messages) is transmitted from the access node 110 using the 4G carrier, while the 5G carrier is utilized for transmission of data. For example, a upperlayerindication-r15 value within a system information broadcast message (e.g. a SIB3 message) can be set to a TRUE value or a FALSE value, wherein a TRUE value indicates that the access node 110 is capable of communicating using both RATs, and a FALSE indication (or no indication) can be indicative that the first access node 110 is not capable of communicating using both RATs. Thus, when a wireless device capable of dual connectivity using both RATs (for example, wireless device 130, or relay node 140) is within range of access node 110 and receives a TRUE indicator, the wireless device can attempt to initiate simultaneous connections (e.g. 5G EN-DC) with both carriers deployed by access node 110. Further, as described above, the capability of the wireless device 130 or relay node 140 to utilize both RATs may be obtained prior to performing these operations. For example, the access node 110 can be configured to receive a capability of the wireless device 130 or relay node 140 via, for example, a radio resource control (RRC) message transmitted therefrom.

In exemplary embodiments described herein, wireless device 130 and/or relay node 140 are instructed to prioritize between attaching to both carriers deployed by access node 110 (i.e. 4G and 5G) versus attaching to just the 4G carrier. In an exemplary embodiment, wireless device 130 and/or relay node 140 can be instructed to prioritize attaching to both carriers independent of a signal level of each carrier measured at wireless device 130 and/or relay node 140. In an exemplary embodiment, when relay node 140 is identified as a relay node (by, for example, an indicator message transmitted from relay node 140 as described below), then the instruction to override signal measurements or to utilize a threshold amount for the signal measurement is performed. This is because relay nodes can benefit from the higher frequencies and channel sizes of 5G donor access nodes, so it is preferred to select a dual-connectivity capable access node utilizing both 4G and 5G as a donor, even if a signal level is lower, versus a donor that is incapable of dual connectivity or incapable of 5G. In other words, a frequency utilized by a 5G NR is sufficient to provide a minimum quality of service for end-user wireless devices 160 attached to the relay node 140. Such high frequencies are useful, for example, in densely populated areas, where relay nodes are more likely to be deployed. In related embodiments, the relay node is instructed to select any 5G-capable access node or combination of access nodes as donors versus any combination of access nodes that is incapable of 5G. For example, if access node 110 was not capable of communicating using both RATs, then relay node 140 can be instructed to prioritize connecting to another access node (not shown) over access node 110.

Conversely, for wireless device 130 that is not identified as a relay node, but is still identified as being capable of dual connectivity using both RATs, the wireless device 130 may be instructed to prioritize attaching to access nodes with the higher signal level, whether or not they are capable of 5G. In an exemplary embodiment, wireless device 130 can be instructed to prioritize attaching to access nodes that are capable of communicating using both RATs, unless a signal level of said access nodes is lower than a signal level of any other access nodes that are configured to use just one RAT. For example, if these wireless devices are end-user wireless devices, then a higher signal level may be more important to provide QoS and a positive user experience than a channel bandwidth or frequency.

Access node 110 can be any network node configured to provide communication between wireless devices 130, 140 and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area 115 in the range of approximately five kilometers to thirty-five kilometers and an output power in the tens of watts. Further, relay node 140 may comprise any combination of a relay wireless device capable of communicating over a wireless backhaul, and a small-cell access node capable of deploying a wireless air interface for wireless devices 160. Relay node 140 may comprise any short range, low power, small-cell access nodes such as a microcell access node, a picocell access node, a femtocell access node, or a home eNodeB device.

Access node 110 and relay node 140 can comprise a processor and associated circuitry to execute or direct the execution of computer-readable instructions to perform operations such as those further described herein. Briefly, access node 110 and relay node 140 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay node 140 can receive instructions and other input at a user interface. Access node 110 communicates with gateway node 102 and controller node 104 via communication links 106, 107. Access node 110 may communicate with each other, and other access nodes (not shown), using a wireless link or a wired link such as an X2 link. Components of exemplary access node 110, relay node 140, and processing nodes coupled thereto, are further described with reference to FIGS. 3-7.

Wireless devices 130, 160 may be any device, system, combination of devices, or other such communication platform capable of communicating wirelessly with access node 110 and/or relay node 140 using one or more frequency bands deployed therefrom. Each of wireless devices 130, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 160. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as capabilities of access node 110, wireless device 130, and relay node 140, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
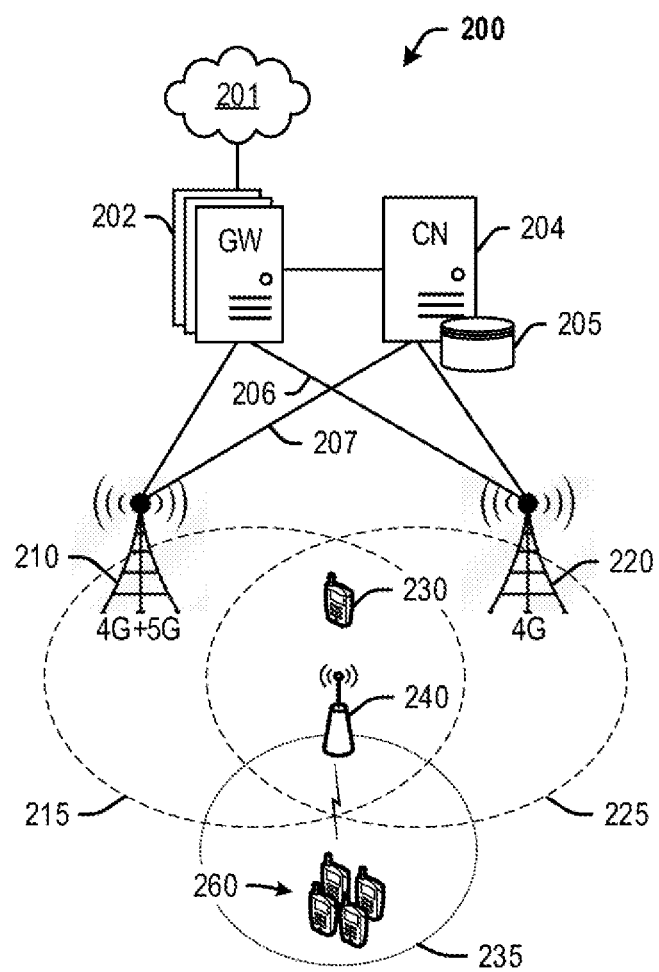
FIG. 2 depicts another exemplary system for communicating via at least two different RATs.

FIG. 2 depicts another system 200 for performing the operations described herein. System 200 comprises components that are similar to system 100, such as a communication network 201, gateway 202, controller node 204, access node 210, wireless device 230, relay node 240, and end-user wireless devices 260. In this exemplary embodiment, access node 210 is configured to include both 4G LTE and 5G NR capabilities within the same apparatus, such that single access node 210 is configured to utilize both RATs and to utilize dual connectivity. For example, a 4G LTE radio/transceiver and a 5G NR radio/transceiver within access node 210 may be virtually coupled with a logical X2 connection, or similar. Further in this embodiment, access node 220 is illustrated as being capable of only 4G LTE communication, and access nodes 210 and 220 are not connected by any direct connection (such as an X2 connection). Moreover, a processing node within system 200 (for example, communicatively coupled to one or more of access node 210, 220, or controller node 204) can be configured to determine whether or not wireless device 230 or relay node 240 are capable of dual connectivity utilizing both RATs, and instruct access node 210 to broadcast the indicator in, for example, a system information message, wherein the indicator indicates (to wireless device 230 and relay node 240) that access node 210 is capable of communicating using both RATs. For example, a upperlayerindication-r15 value within a system information broadcast message (e.g. a SIB3 message) can be set to a TRUE value or a FALSE value, wherein a TRUE value indicates that access node 110 is capable of dual connectivity using both RATs. Further, the processing node may be configured to instruct access node 220 to broadcast a FALSE indication (or no indication), which can be indicative that access node 220 is not capable of dual connectivity using both RATs. Thus, when a wireless device capable of communicating using both RATs (for example, wireless device 230, or relay node 240) is within range of both access nodes 210, 220 and receives a TRUE indicator from access node 210, the wireless device can simultaneously attach to both 4G and 5G carriers deployed from access node 210, or prioritize connections based on a signal level from each access node 210, 220, as further described below.

By virtue of being within both coverage areas 215 and 225, both wireless device 230 and relay node 240 can be in direct communication with one or both of access nodes 210, 220. Further, relay node 240 may be configured to deploy another carrier over a coverage area 235 (that may utilize the same or different frequency, operating mode, or channel bandwidth as the 4G LTE or 5G NR carriers), to which end-user wireless devices 260 can attach. Relay node 240 can be configured to relay data packets between end-user wireless devices 260 and one or both of access nodes 210, 220, which may be referred to as "donor" access nodes when communicating via relay node 240. Thus, wireless devices 260 that are outside a coverage area of donor access node 210, 220 may access network services from donor access node 210, 220 by virtue of being connected to relay node 240. Further, wireless device 230 and relay node 240 may be capable of communicating via both RATs of access node 210. For example, both wireless device 230 and relay node 240 can include 4G LTE and 5G NR transceivers. Thus, in an exemplary embodiment, wireless device 230 and/or relay node 240 are instructed to prioritize between attaching to access node 210 using both carriers versus attaching to access node 220 using only one carrier.

In an exemplary embodiment, wireless device 230 and/or relay node 240 can be instructed to prioritize attaching to access node 210 over access node 220 even if a signal level of access node 220 is higher than that of access node 210. Such an instruction may be made responsive to determining that relay node 240 is configured to operate as a relay, which can benefit from the higher frequencies and larger channel sizes of 5G NR. For example, when relay node 240 is identified as a relay node (by, for example, an indicator message transmitted from relay node 240 as described below), then the instruction to override signal measurements or to utilize a threshold amount for the signal measurement is performed. In other words, relay node 240 is instructed to prioritize an access node utilizing both 4G and 5G as a donor (such as access node 210), even if a signal level of a reference signal from access node 210 is lower, versus a donor access node 220 that is incapable of dual connectivity or incapable of 5G. The signal level of access node 210 may within a threshold amount lower than the signal level of access node 220. For example, if the signal level of access node 210 is between 0 dB-3 dB lower than the signal level of access node 220, then access node 210 is prioritized as a donor, whereas if the signal level of access node 210 is >3 dB lower than the signal level of access node 220, then access node 220 is prioritized as a donor. The signal level may be of a reference signal transmitted from each access node 210, 220. Further, the signal level of access node 210 may include one or more signal levels of one of more signals using each RAT, such as a first signal level from access node 210 using 4G LTE and a second signal level from access node 210 using 5G NR.

Similar operations may be performed by a processing node communicatively coupled to any other network node within system 200. An exemplary processing node can be configured to perform operations including determining that a wireless device (such as wireless device 230 or relay node 240) is within range of a first access node 210 capable of communication using a first RAT and a second RAT, and a second access node 220 capable of communication using the first RAT and not the second RAT, determining that the wireless device 230, 240 is capable of communication using the first RAT and the second RAT, and instructing the wireless device 230, 240 to prioritize attaching to the first access node 210 versus the second access node 220. The wireless device 230, 240 can be instructed to prioritize attaching to the first access node 210 versus the second access node 220 based in part on a signal level received from each access node 210, 220. For example, if it is determined that the wireless device is a relay node 240, the wireless device 240 can be instructed to prioritize attaching to the first access node 210 even when the signal level of the first access node 210 is lower than a signal level of the second access node 220. In an exemplary embodiment, the wireless device 240 is instructed to prioritize attaching to the first access node 210 when the signal level of the first access node 210 is lower than a signal level of the second access node 220 by no more than a threshold amount. Conversely, it if is determined that the wireless device is an end-user wireless device 230 (i.e. not a relay node), the wireless device 230 can be instructed to prioritize attaching to the first access node 210 unless the signal level of the first access node 210 is lower than a signal level of the second access node 220.

In another exemplary embodiment the processing node can be configured to perform operations including determining that a first access node 210 from among a plurality of access nodes 210, 220 is capable of communication using at least two different RATs, determining that a second access node 220 from among the plurality of access nodes 210, 220 is not capable of communication using the at least two different RATs, and instructing a wireless device 230, 240 to prioritize which of the first or second access nodes to attach to based on a signal level of each access node 210, 220. Determining that the first access node 210 is capable of communication using the at least two different RATs comprises one or both of determining that the first access node 210 comprises transceivers capable of communicating using the at least two different RATs, or determining that the first access node 210 is communicatively coupled via a direct connection to a third access node (not shown) from among the plurality of access nodes, the first and third access nodes being configured to utilize each of the at least two different RATs. Instructing the wireless device 230, 240 to prioritize which of the first or second access nodes to attach to based on the signal level comprises instructing the wireless device 230, 240 to attach to the first access node when the signal level of the first access node 210 is lower than the signal level of the second access node 220 by no more than a threshold amount. In an exemplary embodiment, instructing the wireless device 230, 240 to attach to the first access node 210 when the signal level of the first access node is lower than the signal level of the second access node 220 by no more than a threshold amount is performed responsive to determining that the wireless device comprises a relay node 240.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100, 200 may be, comprise, or include computers systems and/or processing nodes. This includes, but is not limited to: access nodes 110, 210, 220, controller nodes 104, 204, relay nodes 140, 240 and/or networks 101, 201.

Figure 3:
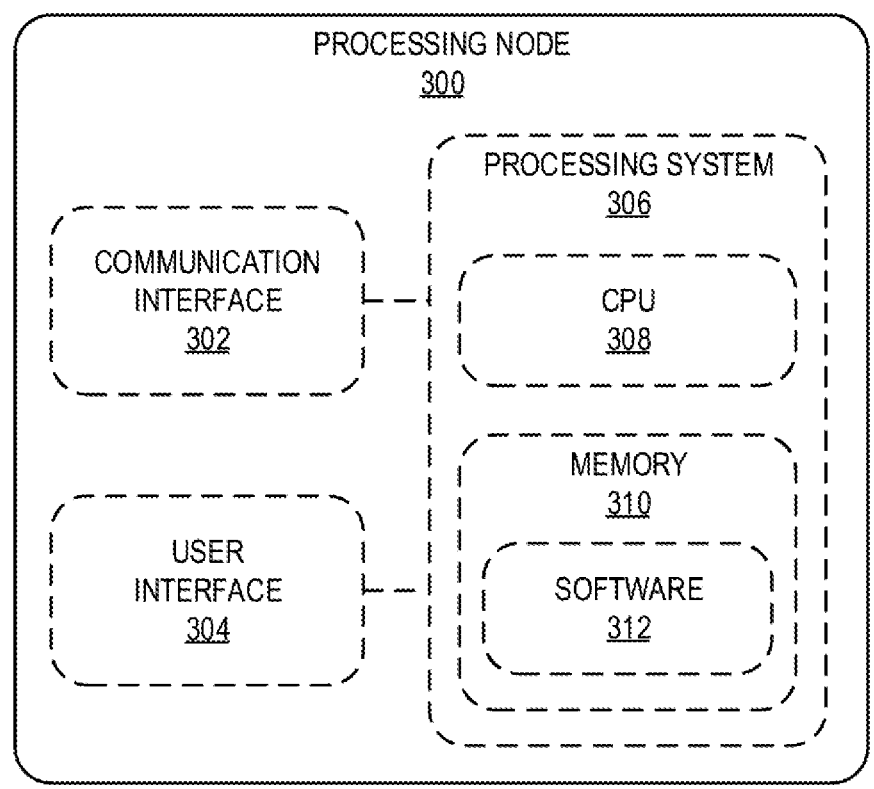
FIG. 3 depicts an exemplary processing node.

FIG. 3 depicts an exemplary processing node 300 for mitigating interference. Processing node comprises a communication interface 302, user interface 304, and processing system 306 in communication with communication interface 302 and user interface 304. Processing system 306 includes a central processing unit (CPU) 308, and a memory 310, which can comprise a disk drive, flash drive, memory circuitry, or other memory device. Memory 310 can store computer programs, firmware, or some other form of machine-readable instructions, including an operating system, utilities, drivers, network interfaces, applications, or some other type of software. Further, memory 310 can store a software 312, which may be executed to perform the interference mitigation operations described herein. Processing system 306 may include other circuitry to retrieve and execute software 312 from memory 310. Processing node 300 may further include other components such as a power management unit, a control interface unit, etc., which are omitted for clarity. Communication interface 302 permits processing node 300 to communicate with other network elements. User interface 304 permits the configuration and control of the operation of processing node 300.

In an exemplary embodiment, software 312 can include instructions for determining when a first access node is capable of communicating via a first RAT and a second RAT and, upon determining when the first access node is capable of communicating via the first RAT and the second RAT, instructing the first access node to broadcast a first indicator, the first indicator indicating that the first access node is capable of communicating via at least two RATs.

In another exemplary embodiment, software 312 can include instructions for determining that a wireless device is within range of a first access node capable of communication using a first RAT and a second RAT, and a second access node capable of communication using the first RAT and not the second RAT, determining that the wireless device is capable of communication using the first RAT and the second RAT, and instructing the wireless device to prioritize attaching to the first access node versus the second access node. The wireless device can be instructed to prioritize attaching to the first access node versus the second access node based in part on a signal level received from each access node. For example, if it is determined that the wireless device is a relay node, the wireless device can be instructed to prioritize attaching to the first access node even when the signal level of the first access node is lower than a signal level of the second access node. In an exemplary embodiment, the wireless device is instructed to prioritize attaching to the first access node when the signal level of the first access node is lower than a signal level of the second access node by no more than a threshold amount. Conversely, it if is determined that the wireless device is an end-user wireless device (and not a relay node), the wireless device can be instructed to prioritize attaching to the first access node unless the signal level of the first access node is lower than a signal level of the second access node.

In another exemplary embodiment, software 312 can include instructions for determining that a first access node from among a plurality of access nodes is capable of communication using at least two different RATs, determining that a second access node from among the plurality of access nodes is not capable of communication using the at least two different RATs, and instructing a wireless device to prioritize which of the first or second access nodes to attach to based on a signal level of each access node. Determining that the first access node is capable of communication using the at least two different RATs comprises one or both of determining that the first access node comprises transceivers capable of communicating using the at least two different RATs, or determining that the first access node is communicatively coupled via a direct connection to a third access node from among the plurality of access nodes, the first and third access nodes being configured to utilize each of the at least two different RATs. Instructing the wireless device to prioritize which of the first or second access nodes to attach to based on the signal level comprises instructing the wireless device to attach to the first access node when the signal level of the first access node is lower than the signal level of the second access node by no more than a threshold amount. In an exemplary embodiment, instructing the wireless device to attach to the first access node when the signal level of the first access node is lower than the signal level of the second access node by no more than a threshold amount is performed responsive to determining that the wireless device comprises a relay node.

Figure 4:
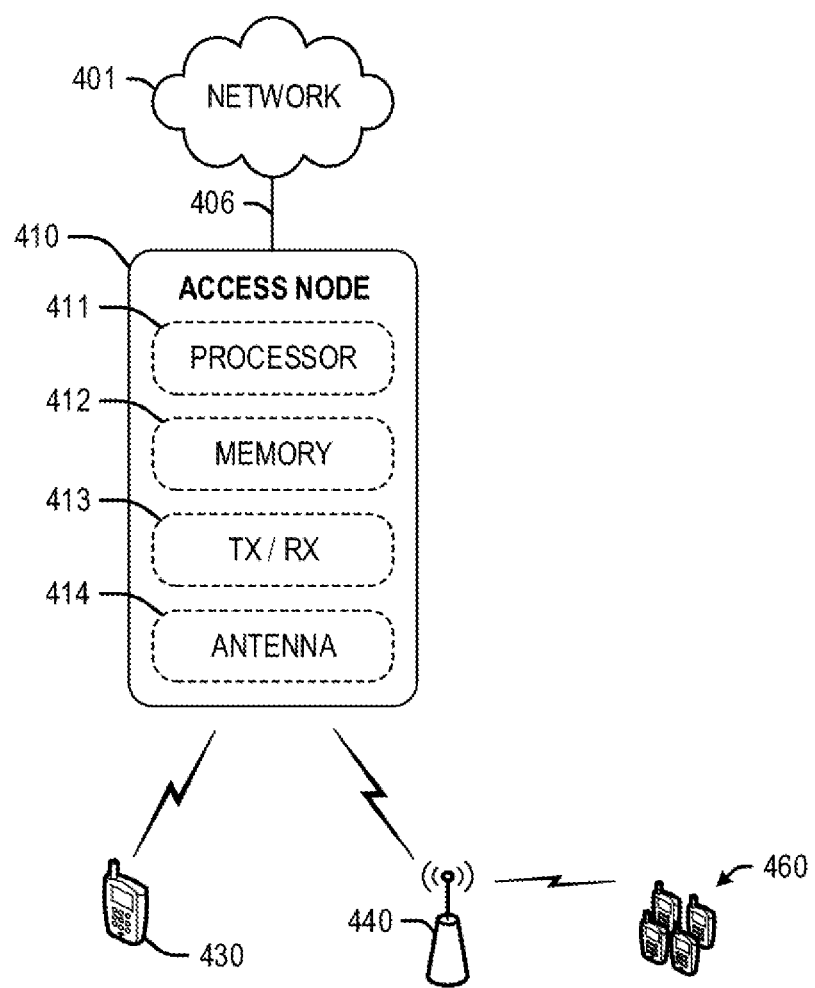
FIG. 4 depicts an exemplary access node.

FIG. 4 depicts an exemplary access node 410. Access node 410 may comprise, for example, a macro-cell access node, such as access node 110 described with reference to FIG. 1. Access node 410 is illustrated as comprising a processor 411, memory 412, transceiver 413, and antenna 414. Processor 411 executes instructions stored on memory 412, while transceiver 413 and antenna 414 enable wireless communication with wireless device 430 and relay node 440. Transceiver 413 and antenna 414 may be associated with one or more RATs. In an exemplary embodiment, transceiver 413 and antenna 414 are associated with 4G LTE. Further, antenna 414 may include an array of antennae that are configured to deploy a radio air interface over one or more wireless sectors, form beams within these sectors, employ multiple-input-multiple-output (MIMO), etc.

Exemplary instructions stored on memory 412 can include instructions for determining whether or not access node 410 is colocated with a second access node associated with a second RAT (e.g. 5G NR) and, upon determining that the access nodes are colocated, instructing the 4G LTE transceiver to broadcast an indicator to wireless device 430, relay node 440, and other wireless devices within a coverage area of access node 410. The first indicator can indicate that access node is colocated with a 5G access node (e.g. a gNodeB) and capable of dual connectivity utilizing both RATs. Upon receiving the first indicator, wireless device 430 and/or relay node 440 attempt to use dual connectivity to attach to both access nodes at the same time. Conversely, if access node 410 is determined to not be colocated with another 5G NR access node, access node 410 may be instructed to transmit another indicator indicating the same, or may not be instructed to transmit any indicator. In this case, wireless device 430 and/or relay node 440 can connect to access node 410 without using dual connectivity, or prioritize attempts to connect to any other access node.

Figure 5:
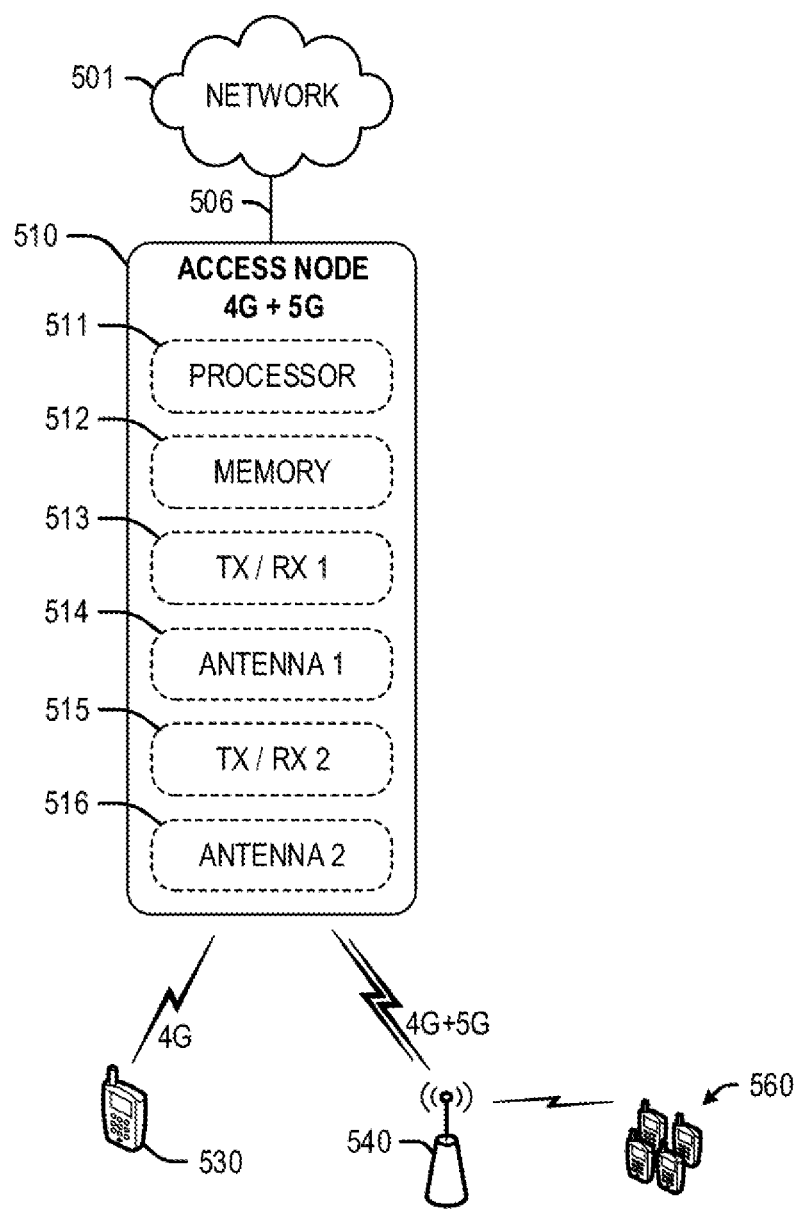
FIG. 5 depicts another exemplary access node capable of communicating via at least two different RATs.

FIG. 5 depicts another exemplary access node 510. Access node 510 is similar to access node 410 in that it may comprise, for example, a macro-cell access node, but different from access node 410 in that it comprises additional transceiver 515 and antenna 516 in addition to processor 511, memory 512, transceiver 513, and antenna 514. While transceiver 513 and antenna 514 enable wireless communication with wireless device 530 and relay node 540 using a first RAT, such as 4G LTE, transceiver 515 and antenna 516 enable wireless communication using a second RAT, such as 5G NR. In other words, access node 510 may be determined as being capable of communicating using both 4G LTE and 5G NR. For example, access node 510 may be configured to transmit control information using the 4G LTE transceivers and data information using the 5G NR transceivers. Further, antennae 514 and 516 may each include an array of antennae that are configured to deploy a radio air interface over one or more wireless sectors, form beams within these sectors, employ multiple-input-multiple-output (MIMO), etc.

Thus, exemplary instructions stored on memory 512 can include instructions for determining whether or not wireless device 530 or relay node 540 are capable of communicating using both RATs, and instruct the access node 510 to broadcast an indicator in, for example, a system information message. For example, access node 510 may use the 4G carrier to control and set up a dual connectivity session with one or both of wireless device 530 and relay node 540. In other words, control information (including SIB messages) is transmitted from the access node 510 using the 4G carrier, while the 5G carrier is utilized for transmission of data. For example, a upperlayerindication-r15 value within a system information broadcast message (e.g. a SIB3 message) can be set to a TRUE value or a FALSE value, wherein a TRUE value indicates that the access node 510 is capable of communicating using both RATs, and a FALSE indication (or no indication) can be indicative that the first access node 510 is not capable of communicating using both RATs. Thus, when a wireless device capable of dual connectivity using both RATs (for example, wireless device 530, or relay node 540) is within range of access node 510 and receives a TRUE indicator, the wireless device can attempt to initiate simultaneous connections (e.g. 5G EN-DC) with both carriers deployed by access node 510. Further, as described above, the capability of the wireless device 530 or relay node 540 to utilize both RATs may be obtained prior to performing these operations. For example, the access node 510 can be configured to receive a capability of the wireless device 530 or relay node 540 via, for example, a radio resource control (RRC) message transmitted therefrom.

In exemplary embodiments described herein, wireless device 530 and/or relay node 540 are instructed to prioritize between attaching to both carriers deployed by access node 510 (i.e. 4G and 5G) versus attaching to just the 4G carrier. In an exemplary embodiment, wireless device 530 and/or relay node 540 can be instructed to prioritize attaching to both carriers independent of a signal level of each carrier measured at wireless device 530 and/or relay node 540. In an exemplary embodiment, when relay node 540 is identified as a relay node (by, for example, an indicator message transmitted from relay node 540 as described below), then the instruction to override signal measurements or to utilize a threshold amount for the signal measurement is performed. This is because relay nodes can benefit from the higher frequencies and channel sizes of 5G donor access nodes, so it is preferred to select a dual-connectivity capable access node utilizing both 4G and 5G as a donor, even if a signal level is lower, versus a donor that is incapable of dual connectivity or incapable of 5G. In other words, a frequency utilized by a 5G NR is sufficient to provide a minimum quality of service for end-user wireless devices 560 attached to the relay node 540. Such high frequencies are useful, for example, in densely populated areas, where relay nodes are more likely to be deployed. In related embodiments, the relay node is instructed to select any 5G-capable access node or combination of access nodes as donors versus any combination of access nodes that is incapable of 5G. For example, if access node 510 was not capable of communicating using both RATs, then relay node 540 can be instructed to prioritize connecting to another access node (not shown) over access node 510.

Conversely, for wireless device 530 that is not identified as a relay node, but is still identified as being capable of dual connectivity using both RATs, the wireless device 530 may be instructed to prioritize attaching to access nodes with the higher signal level, whether or not they are capable of 5G. In an exemplary embodiment, wireless device 530 can be instructed to prioritize attaching to access nodes that are capable of communicating using both RATs, unless a signal level of said access nodes is lower than a signal level of any other access nodes that are configured to use just one RAT. For example, if these wireless devices are end-user wireless devices, then a higher signal level may be more important to provide QoS and a positive user experience than a channel bandwidth or frequency.

Figure 6:
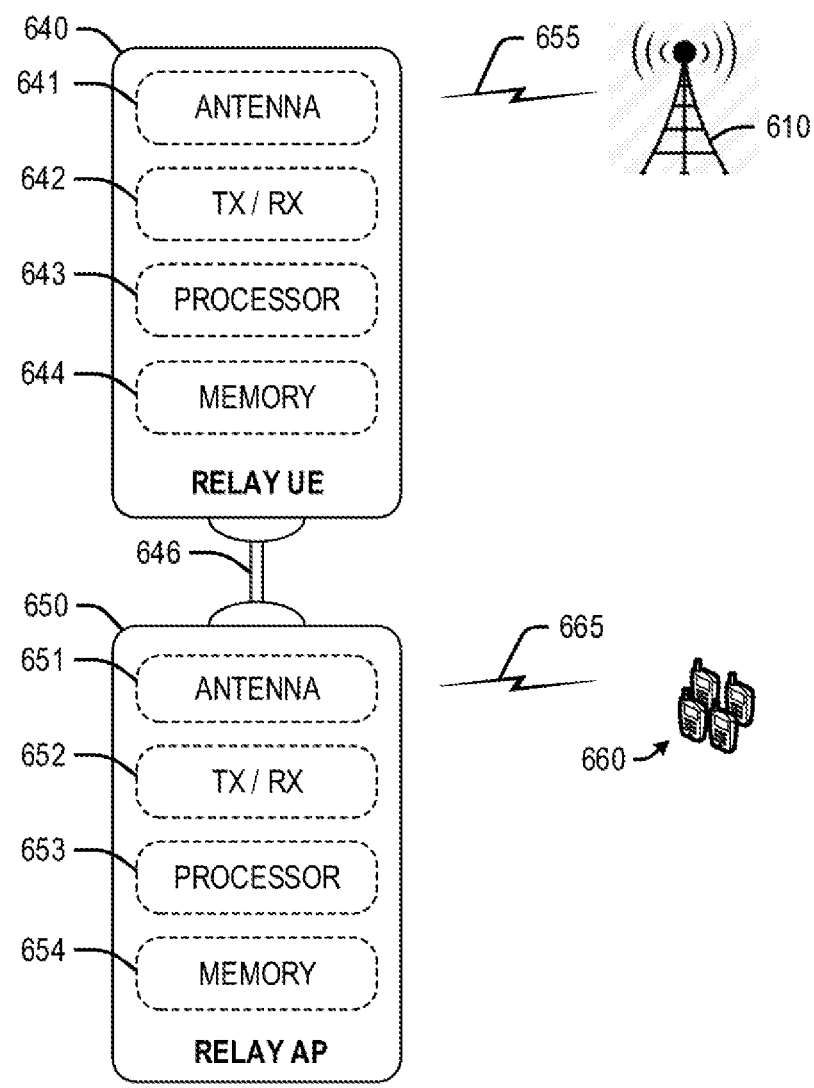
FIG. 6 depicts an exemplary relay node comprising a relay wireless device and a relay access point.

FIG. 6 depicts an exemplary relay node comprising a relay wireless device 640 and a relay access point (AP) 640. Relay wireless device 640 is illustrated as comprising an antenna 641 for direct (i.e. unrelayed) communication with donor access node 610 via wireless backhaul link 645, a transceiver 642, a processor 643, and a memory 644 for storing instructions that enable relay wireless device 640 to perform operations described herein. In some embodiments, relay wireless device 640 is referred to as a customer premise equipment (CPE), which includes any stationary LTE and/or 5G NR wireless device having a stronger computational & RF capability versus standard wireless devices, as well as a directional antenna and a dedicated power supply, enabling relay wireless device 640 to efficiently provide resources to wireless devices 660 via relay access point 650. Consequently, relay access point 650 may be co-located with relay wireless device 640, and is connected to relay wireless device 640 via a communication interface 646. Communication interface 646 may be any interface that enables direct communication between relay wireless device 640 and relay access point 650, such as USB, FireWire, Ethernet, or any other serial, parallel, analog, or digital interface.

In operation, relay wireless device 640 may be configured to relay network services from donor access node 610 to wireless devices 660 via relay access point 650. Relay wireless device 640 may begin to function as a relay wireless device by sending a message to donor access node 610 to indicate to donor access node 610 that wireless device 640 is functioning as a relay wireless device. In some embodiments, relay wireless device 640 can request to send a buffer status report to donor access node 610. Donor access node 610 can grant this request in a conventional manner. Relay wireless device 640 may respond to the grant by sending a short buffer status report. This short buffer status report is associated with a logical channel group that indicates the buffer status report is communicating the status of relay wireless device 640 as a relay, and thus is not asking for additional resource allocations (like a 'conventional' buffer status report would indicate). In other words, when relay wireless device 640 responds with a buffer status report for the 'special' logical channel group, it means that the buffer status report is not actually reporting the status of a buffer.

Rather, this buffer status report indicates that the wireless device is now functioning as a relay. Once status of relay wireless device 640 is established, relay wireless device 640 may instruct relay access point 650 to start accepting connection requests from one or more wireless devices such as wireless device 360. Further, relay access point 650 is illustrated as comprising an antenna 651 and transceiver 652 for enabling communication with wireless device 660, processor 653, and a memory 654 for storing instructions that are executed by processor 653. In some embodiments, relay access point 650 may be a home eNodeB. Moreover, although only one transceiver is depicted in each of relay wireless device 640 and relay access point 650, additional transceivers may be incorporated in order to facilitate communication across interface 626 and other network elements. For example, additional transceivers may be include to enable relay wireless device 640 to utilize dual connectivity using two or more RATs.

Further, based on the indication of relay status, donor access node 610 may alter how relay wireless device 640 is treated. For example, relay wireless device 640 may be provided with preferential treatment because it is functioning as a relay. In an exemplary embodiment, a specific class indicator is assigned to wireless backhaul link 645 between relay wireless device 640 and donor access node 610. The class indicator may be a QCI that is different from other QCIs assigned to wireless devices that are directly connected to donor access node 610. In other embodiments (and as described herein), upon receiving the indication of relay status, donor access node 610 (or a processing node communicatively coupled thereto) can be configured to determine that donor access node 610 is capable of communication using two RATs, to broadcast a first indicator indicating the same, and to instruct relay wireless device 640 to attach to both RATs associated with donor access node 610, utilizing a first RAT (e.g. 4G) to transmit/receive control information, and a second RAT (e.g. 5G) to transmit/receive data information. Further, relay wireless device 640 can be instructed to prioritize which of access node to attach to based on a signal level. For example, upon receiving the relay status, donor access node 610 (or the processing node communicatively coupled thereto) can instruct relay wireless device 640 to attach to donor access node 610 when the signal level of donor access node 610 is lower than a signal level of any other access node by no more than a threshold amount.

Figure 7:
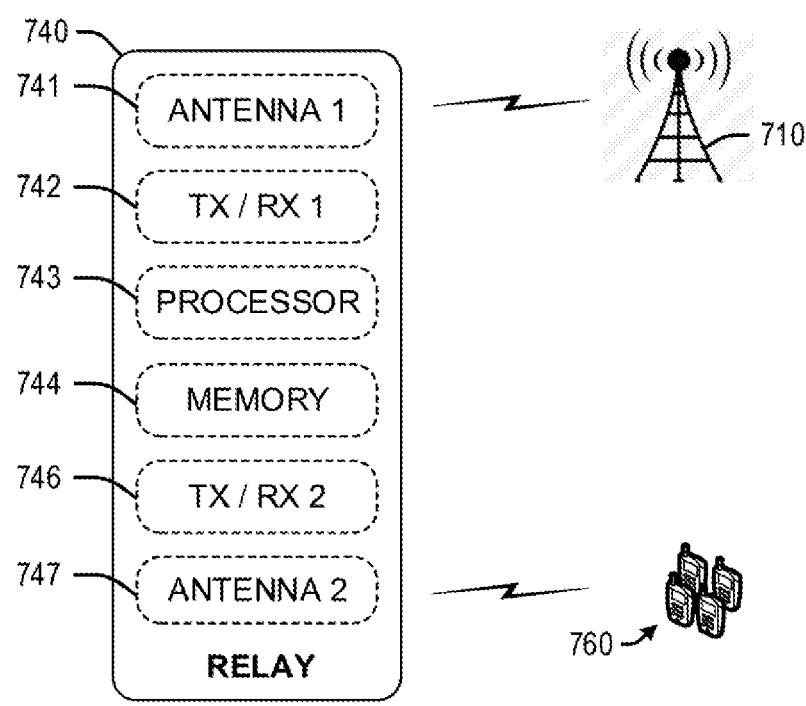
FIG. 7 depicts another exemplary relay node combining a relay wireless device and a relay access point.

In another exemplary embodiment, the relay node may integrate components of both relay wireless device 640 and relay access point 650 into a single unit. FIG. 7 depicts an exemplary relay node 740 of this type. Relay node 740 is illustrated as comprising an antenna 741 for direct (i.e. unrelayed) communication with donor access node 710 via wireless backhaul link 745, a transceiver 742, a processor 743, and a memory 744 for storing instructions that are executed by processor 722 as described herein. Relay node 740 further includes another transceiver 746 and antenna 747 for enabling communication with wireless device 760. Relay node 720 can perform operations similar to those described above with respect to FIG. 6.

In an embodiment, the relay nodes depicted in FIGS. 6-7 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/resassembly). In other words, relay node depicted herein performs demodulation and decoding of the received RF signals (either uplink or downlink), processes received data, then encodes, modulates, and transmits the data to a wireless device.

Figure 8:
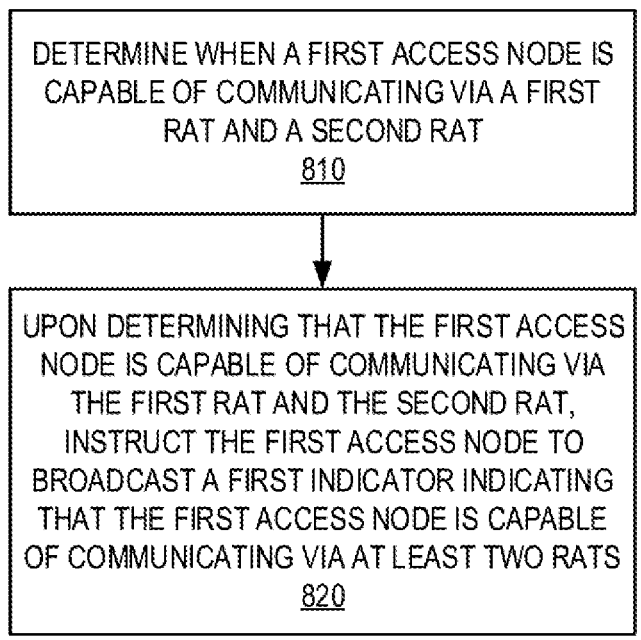
FIG. 8 depicts an exemplary method for communicating via at least two different RATs.

FIG. 8 depicts an exemplary method for dual connectivity using different RATs. The method of FIG. 8 may be implemented by a processing node communicatively coupled to one or more donor access nodes, relay nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, it is determined when a first access node is capable of communicating via a first RAT and a second RAT and, at 820, upon determining that the first access node is capable of communicating via the first and second RATs, the first access node is instructed to broadcast a first indicator, the first indicator indicating that the first access node is capable of communicating via at least two RATs. Upon receiving the first indicator, a wireless device can attach to both first and second RATs. The first access node may among a plurality of access nodes of any type, including macrocell access nodes such as Long-Term-Evolution (LTE) eNodeBs or 5G New Radio (NR) gNodeBs, mini access nodes, home eNodeBs or gNodeBs, etc. In an exemplary embodiment, determining when the first access node is capable of communicating via both first and second RATs at 810 comprises determining that the first access node is combination of an eNodeB and a gNodeB. In other words, the first access node can comprise antennae that are configured to communicate using 4G LTE (i.e. the first RAT) as well as antennae that are configured to communicate using 5G NR (the second RAT). In another exemplary embodiment, determining when the first access node is capable of communicating via both first and second RATs comprises determining that the first access node comprises an eNodeB that is communicatively coupled to a gNodeB. For example, an eNodeB can be coupled with a gNodeB via an X2 connection. Whereas, when it is determined that the first access node comprises transceivers capable of both eNodeB and a gNodeB, the respective transceivers (and associated processing nodes) may be virtually coupled with a logical X2 connection, or similar, such that a single access node is capable of the above functions. Further, in an exemplary embodiment, control information can be transmitted via the first RAT, while data information (i.e. payloads, etc.) can be transmitted via the second RAT. For example, the second RAT is any RAT that utilizes a higher frequency and/or a higher channel bandwidth than the first RAT. Generally, 5G NR utilizes larger channel bandwidths and frequencies than 4G LTE. Thus, transmitting data information using the second RAT (e.g. 5G) can be beneficial to network operation by, for instance, improving throughput, while transmitting signaling information using the first RAT (e.g. 4G) can be beneficial by, for instance, utilizing ubiquitous existing infrastructure for performing signaling operations. In an alternate embodiment, while control information is transmitted using the first RAT, data information can be transmitted using any combination of RATs. Further, the wireless device may comprise any wireless device that is capable of dual connectivity with both first and second RATs. Thus, wireless devices capable of attaching to both 4G LTE and 5G NR may include any wireless device with transceivers capable of such communication, such as a gigabit-class LTE modem and a gigabit-class 5G modem. Such a wireless device can support high frequency, short wave length radio communication associated with 5G NR, and can be capable of adaptive beam-forming and beam tracking, 8X carrier aggregation (CA), combining different 100 MHz blocks of millimeter wave spectrum, etc. are encouraged to do so. Thus, in an exemplary embodiment, operations include determining whether or not the wireless device is capable communicating using both RATs, responsive to which the wireless device can be instructed to attach to both RATs. Further, the wireless device can comprise a relay node that is configured to relay data between an access node and one or more end-user wireless devices attached to the relay node. The relay node may be a small cell access node, a home eNodeB, etc. For example, the relay node can be configured to attach to the first access node using both RATs. In an exemplary embodiment, the relay node includes a relay wireless device coupled to a relay access point, and is configured to relay data packets between an access node and an end-user wireless device attached to the relay access point. For example, the relay wireless device can be capable of communicating with the first access node using both RATs. In embodiments where the wireless device comprises a relay node (or a relay wireless device coupled to a relay access point), the serving access node(s) may be referred to as donor access node(s), and any wireless connection between the donor access node(s) and the wireless device may be referred to as a backhaul connection. In an exemplary embodiment, responsive to determining that the wireless device comprises a relay node, the wireless device is instructed to prioritize attaching to the first access node using both RATs over any other access node using a single RAT, even when a signal measurement of the first access node is lower than a signal measurement of the other access nodes.

Further, instructing the first access node to broadcast the indicator at 820 can include instructing the first access node to broadcast the indicator in a system information message. As described above, the first RAT may be used to control and set up the wireless device, and the second RAT (or any combination of the first and second RATs) may be used to transmit user data. In other words, control information (including system information message broadcasts) is transmitted from using the first RAT. Thus, in an exemplary embodiment, the first access node is instructed to transmit the indicator, which can be received by a wireless device within a coverage area of the first access node. For example, a upperlayerindication-r15 value within a system information broadcast message (e.g. a SIB3 message) can be set to a TRUE value or a FALSE value, wherein a TRUE value indicates that the first access node is capable of communicating via both RATs, and a FALSE indication (or no indication) can be indicative that the first access node is not capable of communicating via both RATs. Thus, when a wireless device capable of communicating via both RATs (for example, a wireless device or relay node with both 4G LTE and 5G NR transceivers as described above) is within range of the first access node and receives a TRUE indicator via a system information broadcast, the wireless device can attach to the access node using both first and second RATs. Further, as described above, the capability of the wireless device to utilize both RATs may be obtained prior to performing these operations. For example, the first access node can be configured to receive a capability of the wireless device via, for example, a radio resource control (RRC) message transmitted from the wireless device.

Figure 9:
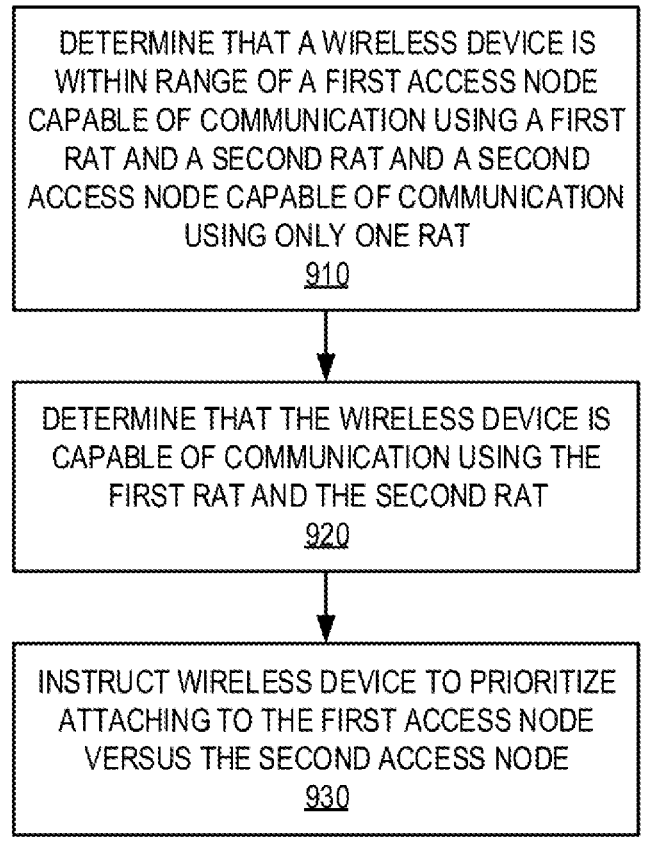
FIG. 9 depicts an exemplary method for communicating via at least two different RATs.

FIG. 9 depicts an exemplary method for dual connectivity using different RATs. The method of FIG. 9 may be implemented by a processing node communicatively coupled to one or more donor access nodes, relay nodes, controller nodes, or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, it is determined that a wireless device is within range of a first access node capable of communication using a first RAT and a second RAT, and a second access node capable of communication using only one RAT. At 920 it is determined that the wireless device itself is capable of communication using both RATs and, at 930, the wireless device is instructed to prioritize attaching to the first access node versus the second access node. As described herein, the first access node may among a plurality of access nodes of any type, including macrocell access nodes such as Long-Term-Evolution (LTE) eNodeBs or 5G New Radio (NR) gNodeBs, mini access nodes, home eNodeBs or gNodeBs, etc. In an exemplary embodiment, determining when the first access node is capable of communicating via both first and second RATs at 810 comprises determining that the first access node is combination of an eNodeB and a gNodeB. In other words, the first access node can comprise antennae that are configured to communicate using 4G LTE (i.e. the first RAT) as well as antennae that are configured to communicate using 5G NR (the second RAT). Further, the second access node may be just an eNodeB or a gNodeB, i.e. capable of communicating via only one RAT.

Further, the first access node is instructed to broadcast a first indicator, the first indicator indicating that the first access node is capable of communicating via at least two RATs. All wireless devices within communication range of the first access node are able to receive this broadcast. However, only wireless devices capable of dual connectivity using both RATs are able to act on this indicator. For example, the wireless device may comprise any wireless device that is capable of dual connectivity with both first and second RATs. Further, the wireless device can comprise a relay node that is configured to relay data between an access node and one or more end-user wireless devices attached to the relay node. Thus, the dual connectivity capability of the wireless device may be obtained prior to performing these operations. For example, at 920, the first access node can be instructed to request a capability of the wireless device via, for example, a radio resource control (RRC) message transmitted from the wireless device. Further, upon receiving the first indicator, at 930 the wireless device is instructed to prioritize attaching to the first access node versus the second access node based in part on a signal level received from each access node. For example, if it is determined that the wireless device is a relay node, the wireless device can be instructed to prioritize attaching to the first access node even when the signal level of the first access node is lower than a signal level of the second access node. In an exemplary embodiment, the wireless device is instructed to prioritize attaching to the first access node when the signal level of the first access node is lower than a signal level of the second access node by no more than a threshold amount. Conversely, it if is determined that the wireless device is an end-user wireless device (and not a relay node), the wireless device can be instructed to prioritize attaching to the first access node unless the signal level of the first access node is lower than a signal level of the second access node.

Figure 10:
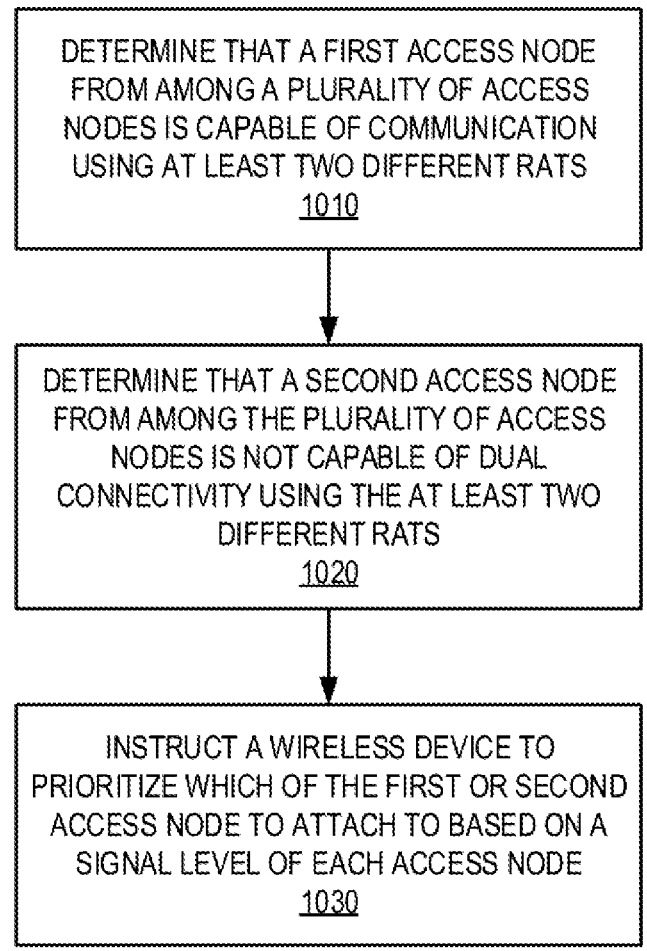
FIG. 10 depicts an exemplary method for communicating via at least two different RATs.

FIG. 10 depicts an exemplary method for dual connectivity using different RATs. The method of FIG. 10 may be implemented by a processing node communicatively coupled to one or more donor access nodes, relay nodes, controller nodes, or any other network node. Although FIG. 10 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1010, it is determined that a first access node from among a plurality of access nodes is capable of communicating using at least two RATs. At 1020, it is determined that a second access node from among the plurality of access nodes is not capable of communicating utilizing the at least two different RATs. Finally, at 1030, a wireless device is instructed to prioritize between attaching to the first access node versus attaching to the second access node based in part on a signal level from each access node. Determining that the first access node is capable of communicating utilizing the at least two different RATs at 1010 comprises one or both of: determining that the first access node is configured to communicate utilizing the at least two RATs, or determining that the first access node is communicatively coupled via a direct connection to a third access node from among the plurality of access nodes, the first and third access nodes being configured to utilize each of the at least two different RATs. Similarly, determining that the second access node from among the plurality of access nodes is not capable of utilizing the at least two different RATs at 1020 comprises determining that the second access node is not configured to communicate utilizing the at least two RATs, or determining that the second access node is not communicatively coupled via a direct connection to any other access node from among the plurality of access nodes that is configured to utilize a different RAT.

Further, instructing the wireless device to prioritize access nodes at 1030 can include overriding a signal measurement and attach to the access node capable of communicating using both RATs. A threshold may be defined for the signal level being lower. For example, a signal level of the access nodes that are colocated and/or capable of dual connectivity using both RATs is required to be within a threshold amount lower than a signal level of the access nodes that are not colocated with the second RAT. In these embodiments, if a wireless device is identified as a relay node, then the instruction to override signal measurements or to utilize the threshold amount is performed. This is because relay nodes can benefit from the higher frequencies and channel sizes of 5G donor access nodes, so it is preferred to select a donor access node capable of communicating over both 4G and 5G, even if a signal level is lower, versus a donor that is incapable of multi-RAT communication. In related embodiments, the relay node is instructed to select any 5G-capable access node or combination of access nodes as donors versus any combination of access nodes that is incapable of 5G. Conversely, when the wireless device is not identified as a relay node, but is still identified as being capable of dual-RAT communication, the wireless device may be instructed to prioritize attaching to access nodes with the higher signal level. In an exemplary embodiment, a wireless device can be instructed to prioritize attaching to access nodes that are colocated and/or capable of dual connectivity with both RATs, unless a signal level of said access nodes is lower than a signal level of any other access nodes that are not colocated or are incapable of dual connectivity with both RATs. For example, if these wireless devices are end-user wireless devices, then a higher signal level may be more important to provide QoS and a positive user experience than a channel bandwidth or frequency.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for communicating via at least two different radio access technologies (RATs), the method comprising:
    determining when a first access node is capable of communicating via at least two RATs comprising a first RAT and a second RAT;
    upon determining when the first access node is capable of communicating via the at least two RATs, instructing the first access node to broadcast a first indicator, the first indicator indicating that the first access node is capable of communicating via at least two RATs;
    determining that a wireless device within range of the first access node is capable of communicating using both first and second RATs; and
    instructing the wireless device to prioritize attaching to the first access node capable of communicating via the at least two RATs versus other access nodes that are not capable of communicating via the at least two RATs, wherein upon receiving the first indicator, the wireless device attaches to the first RAT and the second RAT deployed by the first access node.

2. The method of claim 1, wherein the second RAT utilizes a higher frequency and a higher channel bandwidth than the first RAT.

3. The method of claim 2, wherein the first RAT comprises 4G long term evolution (LTE) and the second RAT comprises 5G new radio (NR).

4. The method of claim 2, wherein communicating via the first RAT and the second RAT comprises communicating control information via the first RAT and communicating data information via the second RAT.

5. The method of claim 1, wherein determining when the first access node is capable of communicating via the first RAT and the second RAT is based on the first access node comprising at least a first transceiver capable of communicating via the first RAT and a second transceiver capable of communicating via the second RAT.

6. The method of claim 1, wherein determining when the first access node is capable of communicating via at least two RATs is based on the first access node being communicatively coupled with a second access node, the first access node comprising at least a first transceiver capable of communicating via the first RAT and the second access node comprising at least a second transceiver capable of communicating via the second RAT.

7. The method of claim 1, wherein the first indicator comprises a true value in a system indicator broadcast message.

8. The method of claim 6, further comprising:
determining when the first access node is not capable of communicating via the at least two RATs; and
instructing the first access node to broadcast a second indicator comprising a false value.

9. The method of claim 1, further comprising instructing the wireless device to prioritize attaching to access nodes that are capable of communicating via the at least two RATs despite a signal level of the access nodes that are capable of communicating via the at least two RATs being lower than a signal level of the access nodes that are not capable of communicating via the at least two RATs.

10. The method of claim 1, wherein the wireless device comprises a relay node configured with at least a first transceiver capable of communicating using the first RAT and a second transceiver capable of communicating using the second RAT.

11. A system for communicating via at least two different radio access technologies (RATs), the system comprising:
a processing node; and
a processor coupled to the processing node, the processor being configured to perform operations comprising:
determining that a wireless device is within range of a first access node capable of communication using a first RAT and a second RAT, and a second access node capable of communication using the first RAT and not the second RAT;
determining that the wireless device is capable of communication using the first RAT and the second RAT; and
instructing the wireless device to prioritize attaching to the first access node versus the second access node based on the first access node being capable of communication using the first and second RATs and the second access node being incapable of communication using the first and second RATs.

12. The system of claim 11, wherein the operations further comprise instructing the wireless device to prioritize attaching to the first access node versus the second access node based in part on a signal level received from each access node.

13. The system of claim 12, wherein the operations further comprise:
determining that the wireless device is a relay node; and
instructing the wireless device to prioritize attaching to the first access node when the signal level of the first access node is lower than a signal level of the second access node.

14. The system of claim 13, further comprising instructing the wireless device to prioritize attaching to the first access node when the signal level of the first access node is lower than a signal level of the second access node by no more than a threshold amount.

15. The system of claim 12, wherein the operations further comprise:
determining that the wireless device is an end-user wireless device; and
instructing the wireless device to prioritize attaching to the first access node unless the signal level of the first access node is lower than a signal level of the second access node.

16. A processing node for communicating via at least two different radio access technologies (RATs), the processing node being configured to perform operations comprising:
determining that a first access node from among a plurality of access nodes is capable of communication using at least two different RATs;
determining that a second access node from among the plurality of access nodes is not capable of communication using the at least two different RATs; and
instructing a wireless device capable of communication using the at least two RATs to prioritize attaching to the first node based on the first access being capable of communication using the at least two different RATs and the second access node not being capable of communication using the at least two different RATs.

17. The processing node of claim 16, wherein determining that the first access node is capable of communication using the at least two different RATs comprises one or both of:
determining that the first access node comprises transceivers capable of communicating using the at least two different RATs, or
determining that the first access node is communicatively coupled via a direct connection to a third access node from among the plurality of access nodes, the first and third access nodes being configured to utilize each of the at least two different RATs.

18. The processing node of claim 17, wherein the operations further comprise instructing the wireless device to attach to the first access node when the signal level of the first access node is lower than the signal level of the second access node by no more than a threshold amount.

19. The processing node of claim 18, wherein instructing the wireless device to attach to the first access node when the signal level of the first access node is lower than the signal level of the second access node by no more than a threshold amount is performed responsive to determining that the wireless device comprises a relay node.

* * * * *